(12) United States Patent
Okada et al.

(10) Patent No.: US 7,527,033 B2
(45) Date of Patent: May 5, 2009

(54) DEVICE AND METHOD FOR ASSISTING INJECTION AND IGNITION OF FUEL OF CYLINDER INJECTION INTERNAL COMBUSTION ENGINE

(75) Inventors: Masaki Okada, Fujisawa (JP); Takahiro Ishida, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 11/631,709

(22) PCT Filed: Jun. 30, 2005

(86) PCT No.: PCT/JP2005/012065

§ 371 (c)(1),
(2), (4) Date: Jan. 5, 2007

(87) PCT Pub. No.: WO2006/003986

PCT Pub. Date: Jan. 12, 2006

(65) Prior Publication Data

US 2008/0000459 A1    Jan. 3, 2008

(30) Foreign Application Priority Data

Jul. 7, 2004    (JP) .............................. 2004-200322

(51) Int. Cl.
*F02M 21/00*    (2006.01)

(52) U.S. Cl. ...................................... 123/298

(58) Field of Classification Search ................. 123/294, 123/298
See application file for complete search history.

(56) References Cited

U.S. PATENT DOCUMENTS

| 4,721,081 A | * | 1/1988 | Krauja et al. | ................ 123/298 |
| 6,854,438 B2 | * | 2/2005 | Hilger et al. | ................. 123/298 |

* cited by examiner

*Primary Examiner*—Hieu T Vo
(74) *Attorney, Agent, or Firm*—McCormick, Paulding & Huber LLP

(57) ABSTRACT

An object of the present invention is to produce a difference in the pressure produced in a plurality of holes formed in a side part of a shield by a fuel injected from a fuel injection valve toward the side part, thereby the fuel flows easily into the shield by way of the holes as a result of this pressure difference. The present invention is a device comprising a heater G/P provided in a cylinder head C/H so as to be exposed to the inside of a cylinder, wherein the heater G/P is continuously heated and serves as an ignition assist source, a shield S whose side part SS is formed in a cylindrical shape covering the heater G/P at a specified interval from the surface of the heater G/P, a plurality of holes S/H formed in the side part SS of the shield S to afford connection between the inside and the outside thereof, a fuel injection valve IN provided in the cylinder head C/H, wherein the fuel injection valve IN has an injection hole IN/H for injecting the fuel toward the side part SS, and an axis line L1 of the injection hole IN/H inclined relative to a perpendicular line L2 perpendicularly extending from the side part SS to the injection hole IN/H.

14 Claims, 4 Drawing Sheets

DEVICE AND METHOD FOR ASSISTING INJECTION AND IGNITION OF FUEL OF CYLINDER INJECTION INTERNAL COMBUSTION ENGINE

CROSS REFERENCE TO RELATED APPLICATIONS

This application is entitled to the benefit of and incorporates by reference essential subject matter disclosed in International Patent Application No. PCT/JP2005/012065 filed on Jun. 30, 2005 and Japanese Patent Application No. 2004-200322 filed Jul. 7, 2004.

TECHNICAL FIELD

The present invention relates to a fuel injection and ignition assist device, and a fuel injection and ignition assist method for a cylinder injection-type internal combustion engine in which, in combusting fuel that has been injected from a fuel injection valve into a cylinder in the same way as occurs in a diesel cycle, the fuel is ignited as a result of coming into contact with a continuously heated heater.

BACKGROUND ART

Due to either lack of self-ignition or unstable ignition, some kind of ignition assist source is required when employing a gas fuel, such as natural gas with low cetane value, as the fuel of a device in which the fuel is injected from a fuel injection valve into the cylinder of an internal combustion engine (engine) at the point when a piston is in the vicinity of the compression Top Dead Center and combusted in the same way as occurs in a diesel cycle. Accordingly, a continuously heated heater (glow plug) is provided as an ignition assist source in the cylinder head, and the fuel is injected through the fuel injection valve toward the heater.

The fuel injection, ignition and combustion processes employed in this system proceed as outlined below. First, during the intake stroke of the engine, air (EGR gas and air for an engine with an EGR device) is suctioned into the cylinder, this air and the like being compressed during a compression stroke to a high-temperature high-pressure state (approximately 500 to 600° C. and 50 to 70 Bar). At a position of the piston in the vicinity of the compression Top Dead Center, fuel (the gas fuel) is injected through the fuel injection valve as a spray toward the heater.

Thereupon, while a self-ignition will occur if the injected fuel is one of high cetane value such as petroleum, a self-ignition does not occur with a gas fuel such as natural gas which has a low cetane value, because of its high self-ignition temperature, which is over 900° C. Accordingly, in this case, a heater constantly maintained at high temperature is provided in a cylinder head as an ignition assist source, and the fuel is injected toward a glowing red-hot heater and ignited and combusted as a result of coming into contact with the heater.

However, an inherent problem of this device is the thermal fatigue of the heater that occurs due to the fuel striking the heater directly. That is to say, the fuel injected at high pressure through the fuel injection valve collides with the heater at comparatively low temperature as a result of adiabatic expansion occurring within the cylinder and causes a rapid cooling of the heater. At the same time, when the heater is exposed to the cylinder, the heater is exposed to the gas in the cylinder and heated and cooled repeatedly as a result of the changes in temperature of the gas, between approximately 2300° C. and air temperature (20° C.), that occur accompanying each of the intake, compression, explosion (expansion) and exhaust strokes. Accordingly, the heater suffers thermal fatigue and its duration of life is shortened. In addition, an ignition failure is also thought to occur as a result of rapid cooling of the heater caused by the fuel injected through the fuel injection valve colliding directly with the heater.

Accordingly, the heater employed in this type of system is normally covered with a shield. In a description of this system with reference to FIGS. 4 and 5, a heater (glow plug) G/P is fitted in a cylinder head C/H of an engine with the lower end thereof projecting from the lower surface of the head C/H, and a shield S is fitted to cover this heater G/P. In addition, a fuel injection valve IN is fitted in the approximate center position of a cylinder bore of the cylinder head C/H, and a plurality of injection holes IN/H are formed in the injection valve IN. The symbol P in the drawing denotes a piston, a combustion chamber C/C being provided as a depression in the top surface of the piston P. In addition, the symbol V denotes an intake valve or an exhaust valve.

The shield S covers the heater G/P at a prescribed interval from the surface of the heater G/P, has a cylindrically-formed side part SS and an essentially semicircular base part SB, and describes an overall bag-like shape (closed type). Holes S/H affording connection between the inside and the outside of the shield S are formed in the side part SS. Because the provision of the shield S prevents the fuel injected through the injection holes IN/H of the fuel injection valve IN from striking the heater G/P directly and, in addition, the heater G/P from being exposed directly to the combustion gas of the combustion chamber C/C, the thermal fatigue of the heater G/P is reduced and, as a result, its duration of life is extended.

The process from fuel injection to ignition and combustion with a heater G/P of a type covered by a shield S will be summarily described. Some (approximately 1/10 of the total) of the fuel (the gas fuel) injected at high pressure (100 to 250 Bar) through the injection holes IN/H of the fuel injection valve IN is injected toward the shield S while the remainder is injected toward and dispersed approximately uniformly into the combustion chamber C/C, each being continuously injected for a prescribed period. That is to say, one of the plurality of injection holes IN/H provided in the fuel injection valve IN is set in the direction of the shield S, the remainder being set in the circumferential direction of the inner wall of the combustion chamber C/C separated by an approximately equal interval.

The fuel injected toward the shield S decelerates as a result of collision with the side part SS thereof; after being warmed by the shield S, flows by way of the holes S/H into the shield S where the fuel is instantly heated to a high temperature by the heater G/P which has been pre-heated to a high temperature; and ignites when reaching its ignition temperature. Subsequently, the combustion gas within the shield S subjected to rapid volume expansion as a result of ignition is instantaneously jetted through the holes S/H. These holes S/H are orientated in the direction toward the vicinity of the remaining injection holes IN/H of the fuel injection valve IN (injection holes IN/H set in a direction that ensures spray and approximately uniform dispersal of the fuel sprayed into the fuel combustion chamber C/C).

For this reason, a flame that is spouted through the holes S/H of the shield S approaches the vicinity of the fuel spray injected through the remaining injection holes IN/H. That is to say, while a further increase in pressure and in temperature occurs across the fuel combustion chamber C/C as a whole as a result of ignition occurring within the shield S, the flame spouted through the holes S/H approaches the fuel spray injected through the injection holes IN/H because, at this stage, the fuel continues to be injected through the injection holes IN/H. As a consequence, ignition begins from the outer circumferential part of the spray consisting of an appropriate mix of air and fuel, and then combustion extends instantly to the remainder of the spray. The injection of the fuel is continued for a prescribed period thereafter and then finishes, whereupon the combustion process gradually finishes. The piston P is in its downward stroke at this time.

This fuel injection and ignition assist device for a cylinder injection-type internal combustion engine, which was developed and researched by the inventors of the present invention and their associates, did not constitute a publicly known art at the time of filing the application. However, examples of prior art references that disclose a heater G/P covered with a shield S include Japanese Utility Model Registration No. 2562423 and Japanese Examined Utility Model Publication No. H7-48982.

The stable operation of the engine requires the ignition and combustion processes described above to be repeated with precision of the order of p sec and, in addition, adequate stability even when the operating conditions (such as the fuel flow rate, intake-air temperature, pressure, intake-air flow rate, swirl strength, temperature of the overall engine) change.

The single most important key process is the contact of the fuel with the heater G/P that serves as the ignition source. In other words, the most important aspect of the process is how the fuel injected toward the shield S for ignition passes through the holes S/H of the shield S and stably (time-wise and volume-wise) contacts the glowing red-hot heater G/P standing by.

As shown in FIG. 6, the inventors of the present invention and their associates have conceived a device in which four holes S/H are provided in a side part SS of a shield S, the four holes S/H being arranged in a square shape on the side part SS, and an axis L1 (See FIGS. 4 and 5) of one injection hole IN/H for injecting fuel toward the shield S among a plurality of injection holes IN/H provided in the fuel injection valve IN being aligned with a perpendicular line L2 (line extending from a middle point X1 in the direction perpendicular to the paper of FIG. 6) extending perpendicularly from a middle point X1 of the four holes S/H of the side part SS.

Using this device type, as the fuel injected through the injection hole IN/H collides perpendicularly with the side part SS of the shield S at the collision point Y1 which is the fuel collision point on the side part SS (the same position as the middle point X1), and as the distances from the collision point Y1 to the holes S/H are the same, it was anticipated that, subsequent to collision, the fuel flows uniformly along the surface of the side part SS toward the four holes S/H and through the holes S/H into the shield S.

However, when the fuel flows along the surface of the side part SS and reaches the holes S/H under identical conditions in this manner, an approximately uniform pressure is produced in the holes S/H as a result of the action of the fuel. As a result, a state as if the holes S/H were covered by a virtual lid composed of the fuel was produced, and it became clear, in actual practice, that the fuel did not flow as easily as anticipated through the holes S/H into the shield S.

More particularly, in the closed type shield S of the illustrated example, the virtual lid composed of the fuel that closes the holes S/H is pressed against the rear side of the holes S/H at an approximately uniform force by the pressure noted above, and, because of the absence of holes, passages or the like (see FIG. 4) through which the pressure within the shield S can be released at this time, the internal pressure of the shield S increases with the result that it becomes much harder for the fuel to flow through the holes S/H into the shield S. The present inventors and their associates confirmed this by testing and simulating.

DISCLOSURE OF THE INVENTION

An object of the present invention lies in the provision of a fuel injection and ignition assist device, and fuel injection and ignition assist method for a cylinder injection-type internal combustion engine in which a difference in the pressure produced in a plurality of holes is produced, wherein the holes are formed in a side part of a shield, by a fuel injected from a fuel injection valve toward the side part, and in which the fuel flows easily into the shield by way of the holes as a result of this pressure difference.

A fuel injection and ignition assist device for a cylinder injection-type internal combustion engine pertaining to a first invention for achieving this object is a device providing a heater, a shield, a plurality of holes, and a fuel injection valve, wherein the heater to be continuously heated is provided as an ignition assist device in a cylinder head so as to be exposed inside the cylinder, the shield whose side part is formed in a cylindrical shape covers the heater at a prescribed interval from the surface of the heater, the plurality of holes are provided in the side part of the shield to afford connection between the inside and outside thereof, and the fuel injection valve having an injection hole to inject fuel toward the side part is provided in the cylinder head, as well as having an axis line of the injection hole which is inclined relative to a perpendicular line extending perpendicularly from the side part toward the injection hole.

According to the first invention, because the axis line of the injection hole of the fuel injection valve is inclined relative to a perpendicular line extending perpendicularly from the side part of the shield, a difference in the pressure produced in the plurality of holes formed in the side part is produced by the fuel injected through the injection hole toward the side part and flowing along the surface of the side part and, as a result, the fuel flows easily through the holes into the shield.

In a fuel injection and ignition assist device for a cylinder injection-type internal combustion engine pertaining to a second invention is a device providing a heater, a shield, a plurality of holes, and a fuel injection valve, wherein a heater to be continuously heated is provided as an ignition assist device in a cylinder head so as to be exposed inside the cylinder, a shield whose side part is formed in a cylindrical shape covers the heater at a prescribed interval from the surface thereof, a plurality of holes are provided in the side part of the shield to provide connection between the inside and outside thereof, and a fuel injection valve having an injection hole to inject fuel toward the side part is provided in the cylinder head, and, in taking an intersectional point of the axis line of the injection hole and the outer circumferential surface of the side part of the shield as an injection collision point, having the different distances from the injection collision point to at least two of the plurality of holes.

According to the second invention, because of the different distances from the injection collision point in the side part of the shield to at least two of the plurality of holes, a difference in pressure is produced when the fuel injected through the injection hole toward the side part and flowing along the surface of the side part reaches the two holes formed in the side part and, as a result, the fuel flows easily through the holes into the shield.

A fuel injection and ignition assist method for a cylinder injection-type internal combustion engine pertaining to a third invention is a method including steps of striking fuel injected from a fuel injection hole to a side part of a cylindrically-formed shield, leading the fuel through a plurality of holes provided in the side part into the shield, igniting by contacting a heater housed in the shield at a prescribed interval from the inner circumferential surface thereof, inclining the injection direction of the fuel injected from the fuel injection valve to the side part of the shield relative to a perpendicular line, extending perpendicularly from the side part of the shield toward the injection hole, producing, as a result, a difference in the pressure in at least two of these holes by the fuel injected to the side part, and leading the fuel injected to the side part through the holes into the shield by utilizing this pressure difference.

According to the third invention, similar to the first invention, because a difference in pressure that acts on the holes of the side part is produced by the fuel injected through the injection hole toward the side part of the shield, any of the holes serves as a flow-in hole through which the fuel is led into the shield, while the other holes serve as relief holes through which pressure within the shield is released to enable the fuel to flow easily into the shield.

BEST MODE FOR CARRYING OUT THE INVENTION

A preferred embodiment of the present invention will be described below in detail with reference to the drawings.

Figure 2:
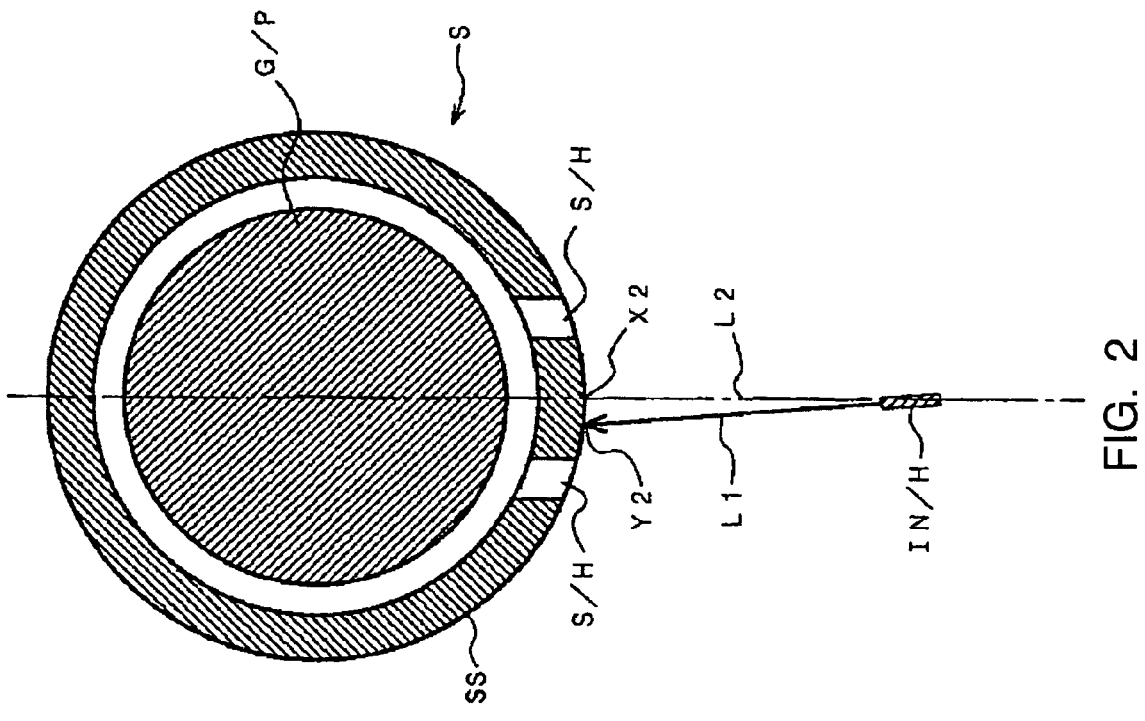
FIG. 2 is a cross-sectional view along the line II-II of FIG. 1.
Figure 1:
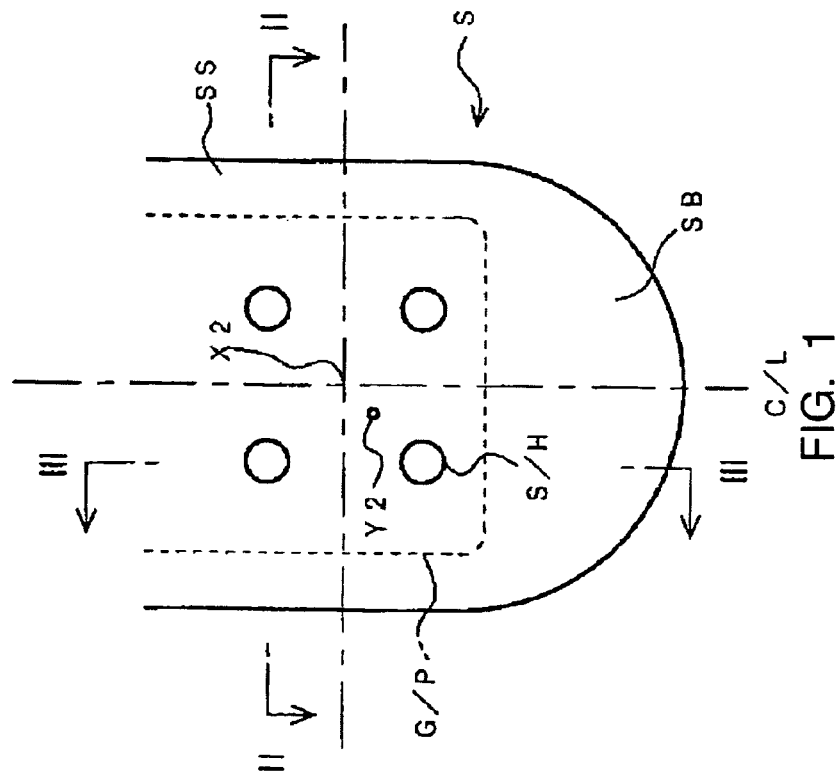
FIG. 1 is a side view of a shield and a heater configuring an ignition device of a fuel injection and ignition assist device for a cylinder injection-type internal combustion engine pertaining to one embodiment of the present invention.
Figure 3:
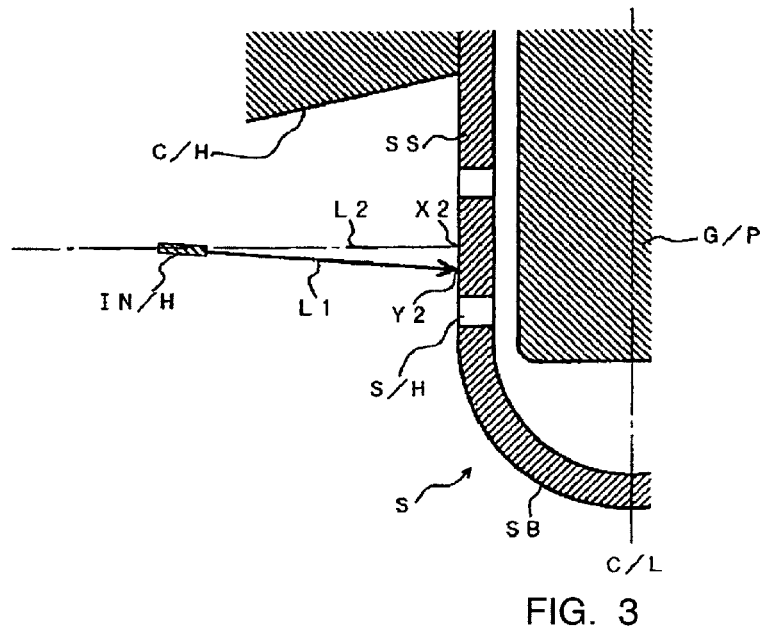
FIG. 3 is a cross-sectional view along the line III-III of FIG. 1.
Figure 4:
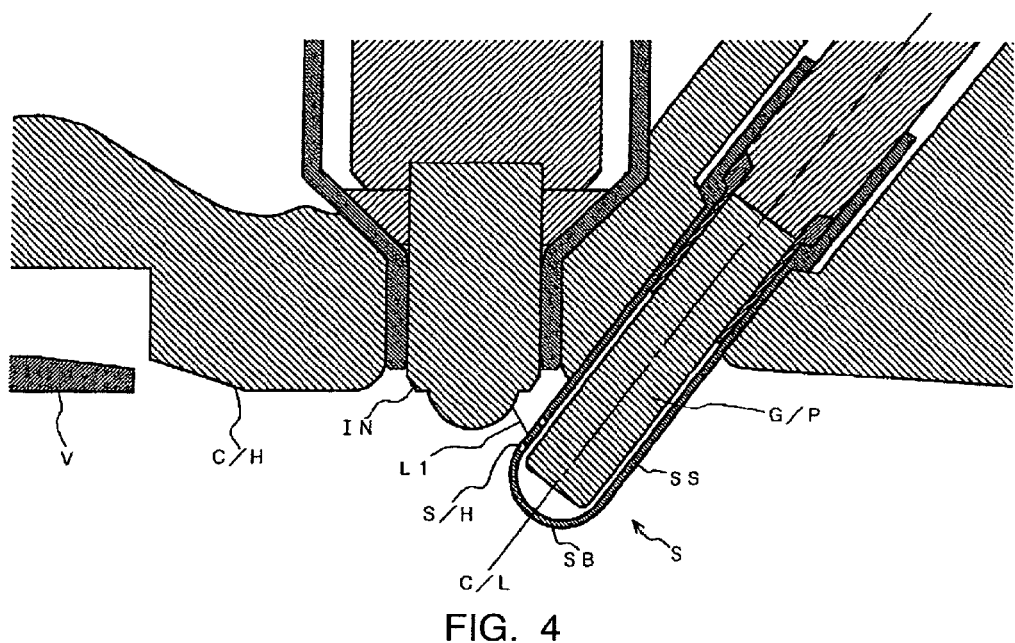
FIG. 4 is a side cross-sectional view of a fuel injection and ignition assist device for a cylinder injection-type internal combustion engine.
Figure 5:
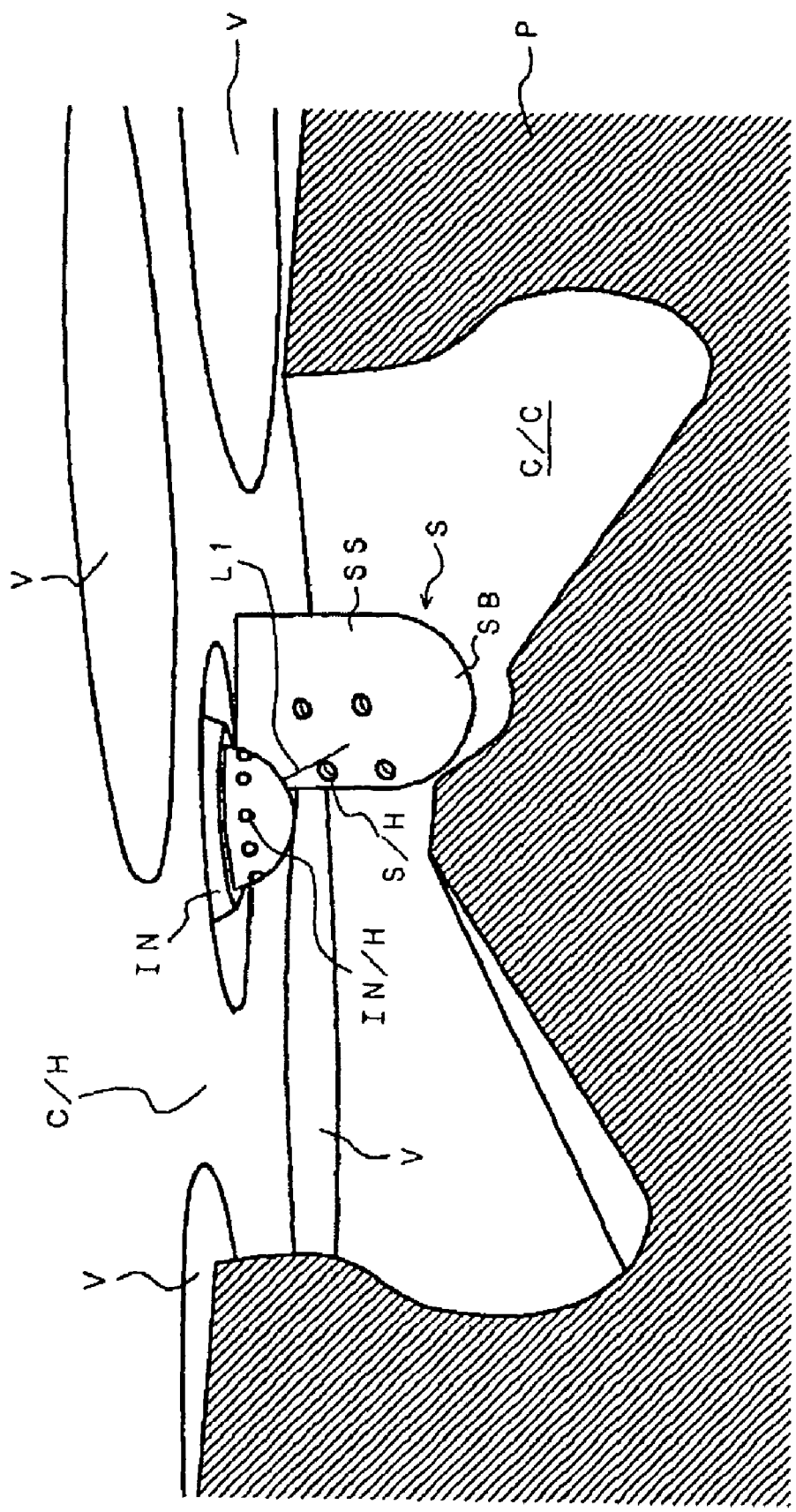
FIG. 5 is a partial broken-out perspective view of the fuel injection and ignition assist device.

The fuel injection and ignition assist device for a cylinder injection-type internal combustion engine pertaining to this embodiment is configured from a heater G/P and a shield S serving as an ignition assist device as shown in FIGS. 1-3, and a fuel injection valve IN serving as a fuel injection device, as shown in FIGS. 4 and 5.

Figure 6:
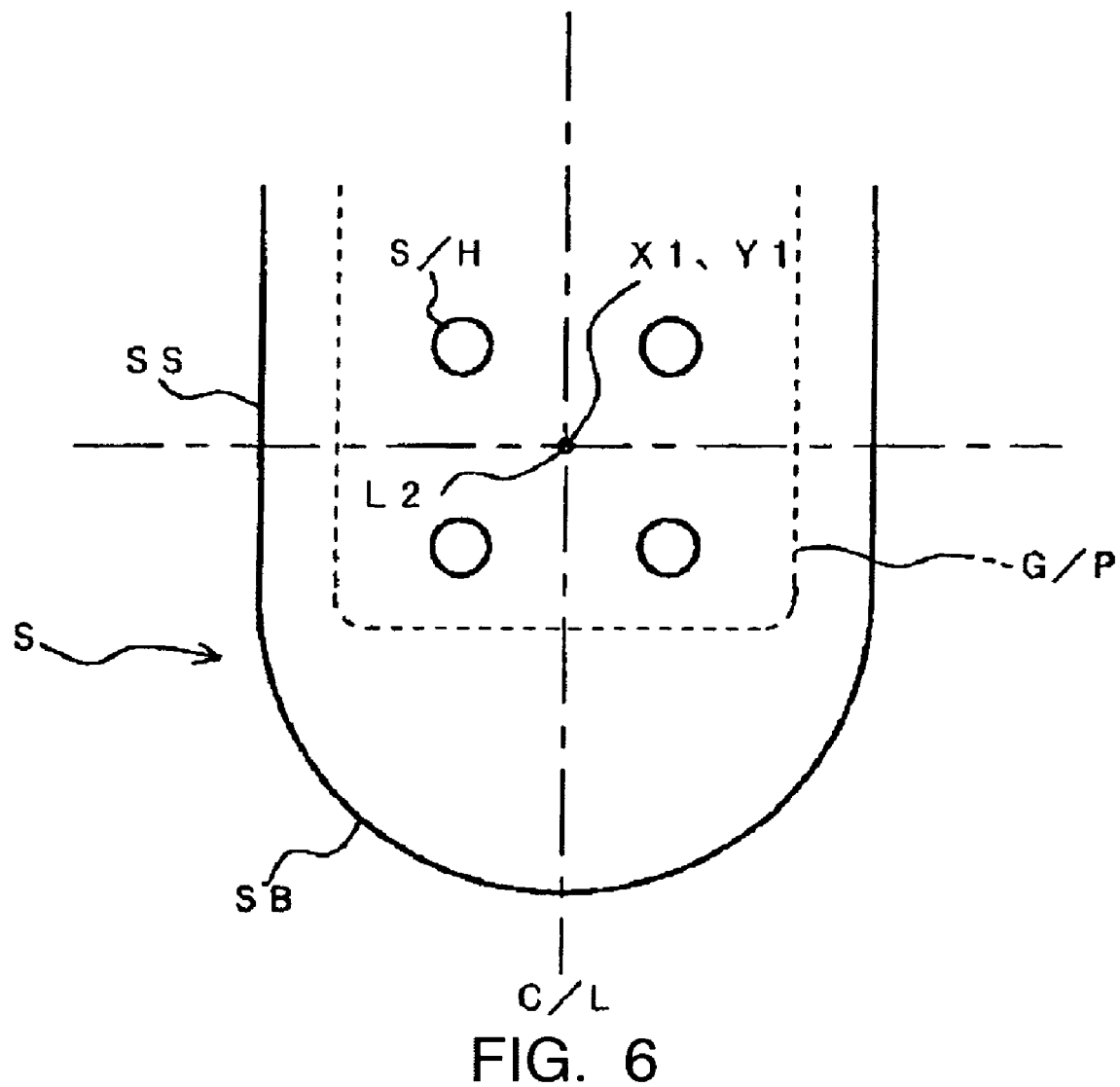
FIG. 6 is a side view of a shield and a heater configuring an ignition device of the fuel injection and ignition assist device previously developed by the inventors of the present invention.

The shape and the constitution of the heater G/P and the shield S pertaining to the present embodiment is fundamentally the same as the above described heater G/P and the shield S shown in FIG. 6. In addition, the constitution of the fuel injection valve IN pertaining to the present embodiment is fundamentally the same as that of the fuel injection valve IN described above. Similarly to the description above, the heater G/P, the shield S and the fuel injection valve IN are fitted in a cylinder head C/H. Accordingly, the identical constituent components are denoted by identical symbols and a detailed description thereof will be omitted.

As shown in FIGS. 2 and 3, a characterizing feature of the present embodiment lies in the inclination of an axis L1 relative to a perpendicular line L2 extending perpendicularly from the side part SS of the shield S toward the injection hole IN/H, wherein the axis L1 is of a specific single injection hole IN/H orientated toward the side part SS of the shield S among the plurality of injection holes IN/H provided in the fuel injection valve IN shown in FIGS. 4 and 5. That is to say, the orientation of the above specified injection hole IN/H and the arrangement of the shield S is devised so that the axis L1 is inclined relative to the perpendicular line L2.

Particularly, as shown in FIG. 2, the axis L1 is inclined relative to the perpendicular line L2 in the circumferential direction of the side part SS of the shield S and, as shown in FIG. 3, in the axial direction of the side part SS. As shown in FIG. 1, the origin of the perpendicular line L2 extending from the side part SS serves here as a middle point X2 of four holes S/H formed in a square shape arrangement in the side part SS, the specified injection hole IN/H being arranged along an extension of the perpendicular line L2.

Taking the point at which the axis L1 intersects the outer circumferential surface of the side part SS as an injection collision point Y2, this injection collision point Y2 is offset at a prescribed equal distance (0.2 mm in the drawing) in each of the circumferential direction and the axial direction of the side part SS relative to the middle point X2. Therefore, in FIG. 1, each of the distances differs, wherein the distances are from the injection collision point Y2 to the lower left hole S/H, from the collision point Y2 to the upper right hole S/H, and from the collision point Y2 to the upper-left hole S/H (this distance being equivalent to the distance from the collision point Y2 to the lower-right hole S/H). If the offset distance of the injection collision point Y2 relative to the middle point X2 differs in the circumferential direction and in the axial direction of the side part SS, the distances from the injection collision point Y2 to each holes S/H will all differ.

In addition, the fuel injection hole IN and the shield S are arranged to three-dimensionally offset (displace) the axis L1 and a center axis C/L so that the axis L1 of the specified injection hole IN/H and the center axis C/L of the shield S do not intersect.

Each axis of the four holes S/H is parallel to the perpendicular line L2.

The action of the fuel injection and ignition assist device (the fuel injection and ignition assist method) for a cylinder injection-type internal combustion engine of the constitution described above will be described.

Some (approximately 1/10 of the total) of the fuel injected at high pressure through injection holes IN/H of a fuel injection valve IN shown in FIGS. 4 and 5 (CNG: gas fuel of low cetane value such as compressed natural gas) is injected toward a side part SS of a shield S through a single specified injection hole IN/H orientated toward the shield S, the remainder being injected toward and dispersed approximately uniformly through the remaining plurality of injection holes IN/H into a fuel combustion chamber C/C, the injection of each being continued for a prescribed period.

That is to say, of the plurality of injection holes IN/H provided in the fuel injection valve IN, a single specified injection hole IN/H is set in the direction of the side part SS of the shield S, the remainder being set in directions in the circumferential direction of the inner wall of the combustion chamber C/C separated by an approximately equal interval. The temperature of the CNG serving as the fuel is approximately 100° C., the injection pressure of the CNG is 100 to 250 atm, the temperature of the combustion chamber C/C is 500 to 600° C., the temperature of the heater G/P is 1000 to 1100° C., and the diameter of the holes S/H is 0.5 mm.

As the axis L1 of the specified injection hole IN/H that is to say the injection direction, is set so as to be inclined in both the circumferential direction and the axial direction of the side part SS relative to the perpendicular line L2 extending perpendicularly from the side part SS, the fuel directed toward the side part SS of the shield S from the specified injection hole IN/H collides three-dimensionally obliquely relative to the side part SS.

For this reason, the speed of the fuel flowing along the surface of the side part SS toward the holes S/H differs for each hole S/H of the holes S/H (to be precise, in the illustrated example, it is essentially the same for the upper-left hole S/H and the lower-right hole S/H of FIG. 1). Furthermore, in addition thereto, because of the different distances from the injection collision point Y2 of the side part SS to the holes S/H, the pressure acting on the holes S/H as a result of the fuel colliding with the side part SS differs for each hole S/H (to be precise, in the illustrated example, it is essentially the same for the upper-left hole S/H and the lower-right hole S/H of FIG. 1 of the illustrated examples). That is to say, a pressure difference is produced between the left holes S/H and the right holes S/H in the circumferential direction of the side part SS shown in FIG. 2 and, a pressure difference is also produced between the upper holes S/H and the lower holes S/H in the axial direction shown in FIG. 3.

As a result, the fuel is able to flow easily into the shield S by way of the specified hole S/H of high pressure. In other words, because, when the pressure between the holes S/H differs, the fuel flows into the shield S through the hole S/H of highest pressure, and, at this time, the holes S/H of low pressure function as relief holes through which the internal pressure of the shield S escapes, the gas within the shield S is inhaled and exhaled with the result that, compared to the device type of FIG. 6, a marked increase in the flow rate of fuel into the shield S occurs.

That is to say, as the balance between the pressure of air within the shield S and the pressure of fuel at the holes S/H outside the shield S differs for each hole S/H due to the difference for each hole S/H in the pressure acting on the holes S/H as a result of the fuel colliding with the side part SS, an inhale/exhale phenomenon as described above is produced in these holes S/H and, consequently, the flow rate of fuel into the shield S increases.

Furthermore, because the downstream-side holes S/H in the injection direction of the fuel (the left hole S/H of FIG. 2 and the lower hole S/H of FIG. 3) have a positional relationship relative to the fuel that flows along the surface of the cylindrically-formed side part SS like that of the blow-in part of a flute, in addition to the inhale/exhale phenomenon produced by the pressure difference described above, the fuel flows easily into the shield S through the holes S/H due to this flute blow-in phenomenon. According to the simulation thereof, a flow rate of the present embodiment was about 5.5 times that of the device type of FIG. 6.

The fuel that flows through the holes S/H into the shield S is heated and ignited by the heater G/P and, because the marked increase in flow rate compared to that of the device type of FIG. 6 was made possible by the present embodiment, the ignition can be stably implemented. Accordingly, the ignition can be ensured even when the fuel injection through the injection hole IN/H of the fuel injection valve IN is of low pressure and small volume as occurs at times of low revolution and low engine load.

In addition, because any of the holes S/H may function as relief holes, the internal pressure of even a closed type shield S, does not increase and, accordingly, the fuel outside the shield S flows quickly into the shield S, passing through the hole S/H other than the holes S/H serving as relief holes. By virtue of this, not only is there an increase in the flow rate of the fuel into the shield S, but also the time from when the fuel is injected though the injection holes IN/H to the ignition can be shortened compared to the device type of FIG. 6 and the ignition delay can be reduced.

In addition, even if the fuel injection conditions of the fuel injection valve IN are identical to those of the device type of FIG. 6, a very large volume of fuel is able to flow through the holes S/H into the shield S and, therefore, a wider range of regulation thereof is possible over various operating ranges. That is to say, the room for alternation is increased in the hole diameter of the injection holes IN/H of the fuel injection valve IN and the diameter, the position, the number and the like of the holes S/H of the shield S. Accordingly, a stable combustion can be provided across all operating ranges of the engine.

Fuel injected at high speed (300 to 400 m/sec) through the injection hole IN/H is decelerated $\frac{1}{5}$ or less as a result of collision with the shield S ($\frac{1}{10}$ in the illustrated example, that is to say, 30 to 40 m/sec) and flows through the holes S/H into the shield S where it is further decelerated to not more than 20 m/sec (not more than 10 m/sec in the illustrated example). Accordingly, the flow speed of the fuel does not cause a cooling of the heater G/P and a stable ignition is ensured.

Thereupon, when the fuel flows through the holes S/H into the shield S, because any of the holes S/H may serve as a flow-in holes and any of the other remaining holes S/H may serve as relief holes through which the pressure within the shield S is released, the pressure distribution within the shield S is non-uniform in the circumferential direction and, furthermore, because the fuel flows obliquely through the holes S/H into the shield S, the fuel that flows into the shield S is circulated (at comparatively low speed as described above) along the inner circumferential surface of the shield S. Accordingly, the heat of the heater G/P is easily conducted to the fuel and a stable ignition is ensured.

In addition, because of the lessening of the thermal fluctuations of the heater G/P resulting from the provision of the shield S, the heat energy (electric power) supplied to the heater G/P can be reduced. In addition, as the shield S is a closed type, fragments may be prevented from dropping into the cylinder in case of damage in the heater G/P caused by some kind of problem.

The embodiments of the present invention are not limited to the types described above. For example, provided the number is two or more, the provision of any number of holes S/H is possible.

While the arrangement of the holes S/H changes correlatively with the number of the holes S/H, the arrangement thereof should produce a difference in pressure in each holes S/H as a result of, for example, a non uniform distance relationship from the fuel collision point Y2, for example a polygon shape (not necessarily a square polygon shape) arrangement that incorporates the collision point Y2 being suitable therefor.

The axis L1 is able to be inclined in any direction relative to the perpendicular line L2, and it may be inclined to the circumferential direction only or the axial direction only of the side part SS.

The fuel is not limited to a gas fuel such as CNG and, for example, any fuel of low cetane value that does not ignite only by compression, such as an alcohol, fuel may be considered.

In addition, the axis L1 of the injection hole IN/H may be set so as to perpendicularly intersect the side part SS at the collision point Y2 of FIG. 1. Even in this case, because the distance from the collision point Y2 to the left lower hole S/H, the distance from the collision point Y2 to the right upper hole S/H, and the distance from the collision point Y2 to the left upper hole S/H (this distance is equal to the distance from the collision point Y2 to the right lower hole S/H) all differ, the pressure of the fuel acting on the holes S/H in response thereto differs and the inhale/exhale phenomenon described above is produced which, accordingly, results in an increase in the flow rate of fuel into the shield S compared to that of the device type of FIG. 6. In other words, provided the distance from the collision point Y2 to at least two holes S/H of the holes S/H differs, the axis L1 may be perpendicular relative to the side part SS and, accordingly, it is not limited to being inclined relative to the side part SS in the manner of the embodiment shown in FIGS. 1 to 3. Provided the offset distance of the injection collision point Y2 relative to the middle point X2 is different in the axial direction and the circumferential direction of the side part SS, the distances from the injection collision point Y2 to each of the holes S/H will differ.

In addition, if the axis L1 is inclined in any direction relative to the perpendicular line L2 in FIGS. 2 and 3, the fuel collision point Y2 of FIG. 1 may correspond with the middle point X2. This is possible because in this case as well there is a difference in fuel pressure between the holes S/H located in the direction along the incline of the axis L1 and the holes S/H located in the opposing direction to this incline.

In addition, the shield S may be a so-called open type that has an opened base part SB.

While the present invention has been illustrated and described with respect to a particular embodiment thereof, it should be appreciated by those of ordinary skill in the art that various modifications to this invention may be made without departing from the spirit and scope of the present invention.

The invention claimed is:

1. A fuel injection and ignition assist device for a cylinder injection-type internal combustion engine in which a heater to be continuously heated is provided as an ignition assist source in a cylinder head so as to be exposed inside a cylinder, a shield whose side part is formed in a cylindrical shape covers the heater at a prescribed interval from a surface of the heater, a plurality of holes are formed in the side part of the shield to afford connection between the inside and the outside thereof, and a fuel injection valve having an injection hole for injecting fuel toward the side part is provided in the cylinder head,
   wherein an axis line of the injection hole is inclined in a circumferential direction and an axial direction of the side part relative to a perpendicular line extending perpendicularly from the side part to the injection hole.

2. The fuel injection and ignition assist device for a cylinder injection-type internal combustion engine according to claim 1, wherein, when taking a point at which the axis line of the injection hole intersects the outer circumferential surface of the side part of the shield as an injection collision point, distances from the injection collision point to at least two holes of the plurality of holes differ.

3. The fuel injection and ignition assist device for a cylinder injection-type internal combustion engine according to claim 2, wherein the shield is a closed shield having a closed base part.

4. The fuel injection and ignition assist device for a cylinder injection-type internal combustion engine according to claim 1, comprising an arrangement in which the axis line of the injection hole does not intersect a center line of the shield.

5. A fuel injection and ignition assist device for a cylinder injection-type internal combustion engine in which a heater to be continuously heated is provided as an ignition assist source in a cylinder head so as to be exposed inside a cylinder, a shield whose side part is formed in a cylindrical shape covers the heater at a prescribed interval from a surface of the heater, a plurality of holes are formed in the side part of the shield to afford connection between the inside and the outside thereof, and a fuel injection valve having an injection hole for injecting fuel toward the side part is provided in the cylinder head, wherein an axis line of the injection hole does not intersect a center line of the shield, and wherein the axis line of the injection hole is inclined relative to a perpendicular line extending perpendicularly from the side part to the injection hole.

6. The fuel injection and ignition assist device for a cylinder injection-type internal combustion engine according to claim 1, wherein the shield is a closed shield having a closed base part.

7. The fuel injection and ignition assist device for a cylinder injection-type internal combustion engine according to claim 5, wherein, when taking a point at which the axis line of the injection hole intersects the outer circumferential surface of the side part of the shield as an injection collision point, distances from the injection collision point to at least two holes of the plurality of holes differ.

8. The fuel injection and ignition assist device for a cylinder injection-type internal combustion engine according to claim 7, wherein the shield is a dosed shield having a dosed base part.

9. The fuel injection and ignition assist device for a cylinder injection-type internal combustion engine according to claim 5, wherein the shield is a dosed shield having a dosed base part.

10. A fuel injection and ignition assist method for a cylinder injection-type internal combustion engine comprising steps of striking fuel injected from a fuel injection valve to a cylindrically-formed side part of a shield, leading the fuel through a plurality of holes provided in the side part into the shield, and igniting the fuel by contacting a heater housed in the shield at a prescribed interval from an inner circumferential surface thereof,
   wherein said fuel injection and ignition assist method for a cylinder injection-type internal combustion engine comprising steps of inclining an injection direction of the fuel injected from the fuel injection valve to the side part of the shield relative to a perpendicular line extending perpendicularly from the side part of the shield toward the injection hole, consequently producing a difference in the pressure produced in at least two of the holes by the fuel injected to the side part, and leading the fuel injected to the side part through the holes into the shield by using the pressure difference thereof.

11. The fuel injection and ignition assist method for a cylinder injection-type internal combustion engine according to claim 10 comprising different distances from the injection collision point to at least two holes of the plurality of holes, when taking a point at which an extended line of the injection direction intersects an outer circumferential surface of the side part of the shield as an injection collision point.

12. The fuel injection and ignition assist method for a cylinder injection-type internal combustion engine according to claim 11, comprising steps of decelerating the fuel injected though the fuel injection valve as a result of striking on the side part of the shield, leading the decelerated fuel through the holes into the shield, and further decelerating the led fuel within the shield and circulating along the inner circumferential surface of the shield.

13. The fuel injection and ignition assist method for a cylinder injection-type internal combustion engine according to claim 10, comprising steps of decelerating the fuel injected though the fuel injection valve as a result of striking on the side part of the shield, leading the decelerated fuel through the holes into the shield, and further decelerating the led fuel within the shield and circulating along the inner circumferential surface of the shield.

14. The fuel injection and ignition assist method for a cylinder injection-type internal combustion engine according to claim 13, comprising steps of decelerating the initial injection speed of the fuel injected through the fuel injection valve to 1/5 or more as a result of striking the fuel on the side part of the shield, and further decelerating in the shield to not more than 20 m/sec.

* * * * *